United States Patent [19]
Bando et al.

[11] Patent Number: 5,397,224
[45] Date of Patent: Mar. 14, 1995

[54] ELONGATED ROLLER SIDE SEALS FOR A ROTARY ENGINE

[75] Inventors: Yoshihiro Bando; Kazuaki Bando, both of Tokushima, Japan

[73] Assignee: Bando Kiko Co., Ltd., Tokushima, Japan

[21] Appl. No.: 87,718

[22] PCT Filed: Dec. 9, 1992

[86] PCT No.: PCT/JP92/01604
§ 371 Date: Jul. 12, 1993
§ 102(e) Date: Jul. 12, 1993

[87] PCT Pub. No.: WO93/12330
PCT Pub. Date: Jun. 24, 1993

[30] Foreign Application Priority Data
Dec. 13, 1991 [JP] Japan .................... 3-352051
Jun. 29, 1992 [JP] Japan .................... 4-194759

[51] Int. Cl.6 .............. F02B 55/02; F01C 19/08
[52] U.S. Cl. .................... 418/142; 418/144; 277/175
[58] Field of Search ........... 418/147, 144; 277/81 P, 277/138, 173, 175

[56] References Cited
U.S. PATENT DOCUMENTS
3,238,929 3/1966 Brodbeck et al. .
3,765,806 10/1973 Gutbrob ................ 418/142
4,822,262 4/1989 Bando ................... 418/142

FOREIGN PATENT DOCUMENTS
50-69410 6/1975 Japan .
50-123710 10/1975 Japan .
51-136013 11/1976 Japan .
59-16482 5/1984 Japan .
63-147925 6/1988 Japan .
2-169823 6/1990 Japan .

Primary Examiner—Richard A. Bertsch
Assistant Examiner—Charles G. Freay
Attorney, Agent, or Firm—Nixon & Vanderhye

[57] ABSTRACT

A rotary engine 1 includes a side housing 2, an intermediate housing 12, a rotor housing 3, a rotor 4 accommodated rotatably in the rotor housing 3; side seal grooves 6 formed on both side surfaces 5 and 25 of the rotor 4; springs 8 for urging side seals 7 fitted respectively in the side seal grooves 6 toward the side housing 2 and the intermediate housing 12, and flexible linear rollers 10 each accommodated between a side wall surface 9 of the side seal groove 6 and the side seal 7.

67 Claims, 10 Drawing Sheets

ELONGATED ROLLER SIDE SEALS FOR A ROTARY ENGINE

TECHNICAL FIELD

The present invention relates to an internal combustion engine, and more particularly to a rotary engine.

BACKGROUND ART

A rotary engine used in an automobile or the like comprises a rotor housing; a side housing and an intermediate housing arranged in such a manner as to sandwich the rotor housing from both sides thereof; a rotor accommodated rotatably in the rotor housing; side seal grooves formed respectively on both side surfaces of the rotor facing the side housing and the intermediate housing; side seals accommodated respectively in the side seal grooves; and apex seals disposed at apexes of the rotor.

In the side seals of the rotary engine, end faces thereof at positions projecting from the side seal grooves are urged toward and are made to slidably abut against the side housing and the intermediate housing that face the end faces, respectively, by means of springs accommodated in the side seal grooves, thereby attaining primary gastightness with respect to an engine operating chamber. The rotor axis-side side surfaces of the side seals are urged toward and are made to slidably abut against side wall surfaces of the side seal grooves facing those respective side surfaces by means of gas pressure and the like, thereby attaining secondary gastightness with respect to the engine operating chamber.

Since the side seal has a long length, and distances from the rotor center to respective positions thereof differ, the magnitudes and directions of sliding resistance and inertial force at the respective positions thereof differ respectively. For this reason, each side seal abuts against the side wall surface of the side seal groove in an unnatural posture. In addition, the frictional resistance of contact between the side seal and the side wall surface of the side seal groove is large (which is considered to be 0.1 to 0.3 in terms of a coefficient of friction), and even if the side seal is subjected to a lifting force by the gas pressure inside the side seal groove when the side seal is pressed against the side wall surface of the side seal groove by the gas pressure from the engine operating chamber, the behavior of the side seal is poor, and the sliding contact of the side seal with respect to the side housing is not established sufficiently. For this reason, high-temperature gases burst out from the gap between the side seal and the side housing, thereby resulting in the overheating of the rotary engine and causing damage to a rotor oil seal. This overheating of the rotary engine causes deformation of the rotary engine, i.e., deformation of the side housing, thereby resulting in a vicious circle of bringing about further gas leakage.

In particular, combustion gases leaking from the side seal circulate to the intake side and are sucked in by being mixed with a fresh intake gas, thereby constituting a cause of misfiring and resulting in a decline in output.

The present invention has been devised in view of the above-described aspects, and its object is to provide a rotary engine which increases the mobility of each side seal in the side seal groove toward the sliding surfaces of the side housing and the intermediate housing so as to prevent a gap from being formed between an end face of the side seal and the respective sliding surfaces of the side housing and the intermediate housing, thereby making it possible to attain primary gastightness more reliably without deteriorating secondary gastightness.

DISCLOSURE OF INVENTION

In accordance with the present invention, the above-described object is attained by a rotary engine comprising: a rotor housing; a side housing and an intermediate housing arranged in such a manner as to sandwich the rotor housing from both sides thereof; a rotor accommodated rotatably in the rotor housing; a side seal groove formed on each of both side surfaces of the rotor facing the side housing and the intermediate housing; side seals each accommodated in the side seal groove; springs for pressing the side seals against the side housing and the intermediate housing, respectively; and a linear roller accommodated along the side seal between a side wall surface of the side seal groove and the side seal.

In addition, the above-described object is also attained by a rotary engine comprising: a side housing; a rotor housing; a rotor accommodated rotatably in the rotor housing; a side seal groove formed on a side surface of the rotor facing the side housing; a side seal accommodated in the side seal groove; a spring for urging the side seal against the side housing; and at least one linear roller accommodated between a side wall surface of the side seal groove and the side seal along the side seal.

In one aspect of the present invention, a groove is formed on a rotor axis-side side surface of the side seal, and the linear roller is accommodated in the groove. In another example, a stepped portion is formed on a rotor axis-side side surface of the side seal, and the linear roller is accommodated in a recess of the stepped portion.

In addition, in the present invention, a thin steel sheet against which the linear roller abuts may be attached on a side wall surface of the side seal groove facing a rotor axis-side side surface of the side seal. A groove for accommodating the linear roller may be formed in this thin steel sheet.

In the present invention, one linear roller may be used, but a plurality of linear rollers may be arranged in parallel, or a plurality of linear rollers may be arranged in series. In a case where a plurality of linear rollers are arranged in parallel and in series, if positions of opposing ends of the linear rollers in adjacent two rows of the linear rollers are made mutually different, it is possible to prevent a decline in gastightness.

In the rotary engine of the present invention, the side seal accommodated in the side seal is urged by the spring, and its end face is brought into slidable contact with the side housing. The side seal behaves lightly and speedily through linear contact or rolling contact between the linear roller and the side seal groove, so that the sliding contact of the side seal with respect to the sliding surfaces of the side housing and the intermediate housing is effected reliably, thereby securing sufficient gastightness.

As described above, in accordance with the present invention, the sliding contact of the side seal with respect to the sliding surfaces of the side housing and the intermediate housing is improved, it is possible to reliably prevent leakage of combustion gases and the like, primary gastightness can be maintained reliably, the overheating of the engine, misfiring and the like can be prevented, and the output can be improved.

Hereafter, a more detailed description of the present invention will be given on the basis of specific examples shown in the drawings. Hence, the above object and features as well as other objects and features of the present invention will become more apparent. It should be noted that the present invention is not restricted to these specific examples.

EMBODIMENTS

Figure 1:
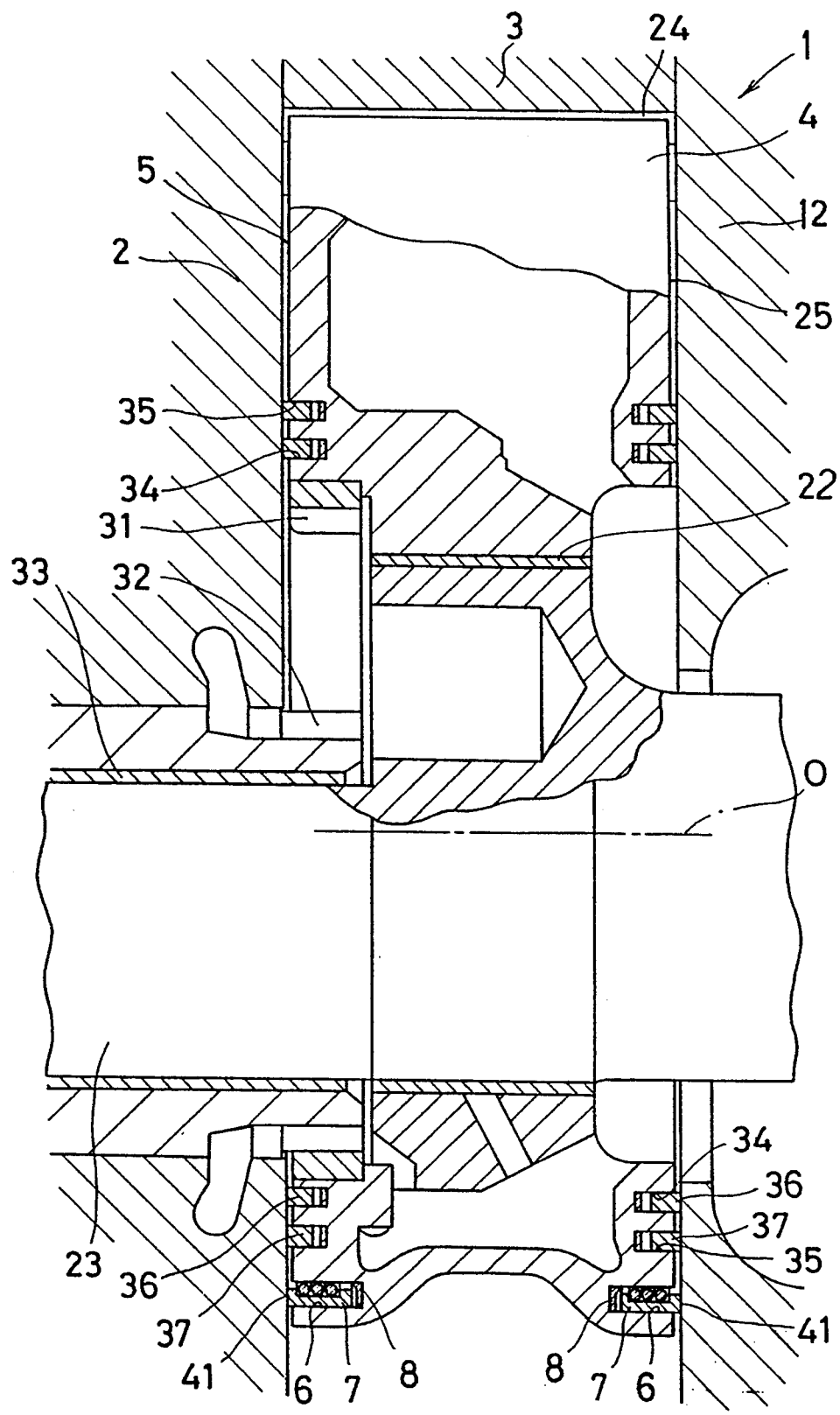
FIG. 1 is a cross-sectional view of a preferred embodiment of the present invention.
Figure 2:
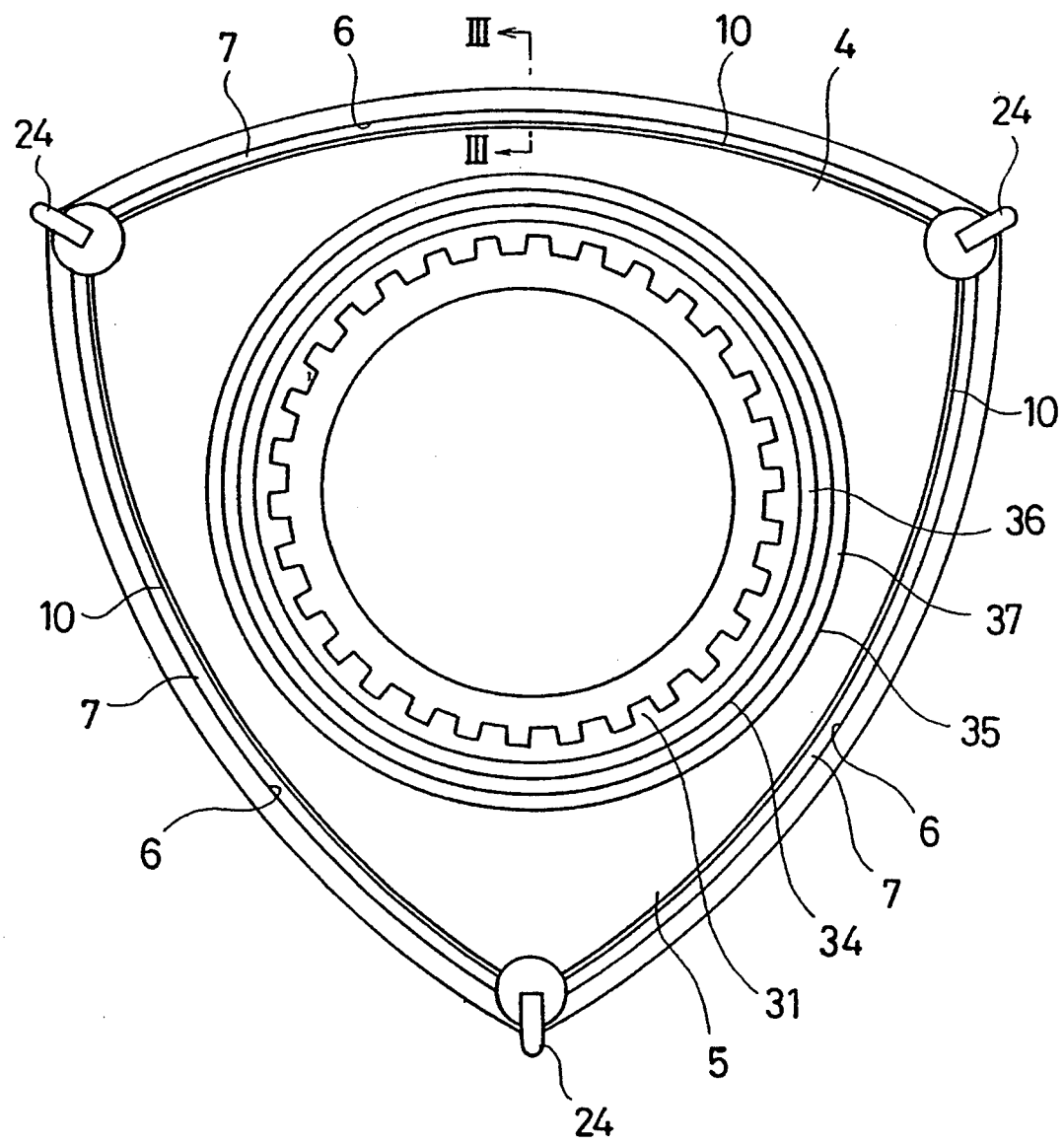
FIG. 2 is a side elevational view of a rotor and the like shown in FIG. 1.
Figure 3:
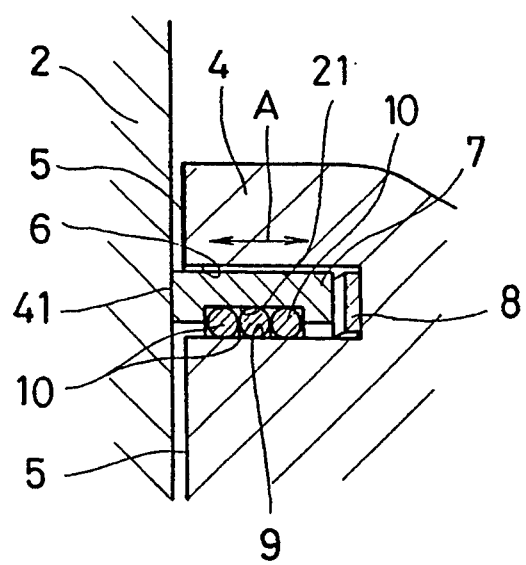
FIG. 3 is a cross-sectional view taken along line III—III shown in FIG. 2.
Figure 4:
FIG. 4 is a detailed perspective view of linear rollers and a side seal shown in FIG. 2.

In FIGS. 1 to 4, a rotary engine 1 of this embodiment comprises a side housing 2; an intermediate housing 12; a rotor housing 3; a rotor 4 accommodated rotatably in the rotor housing 3; arcuate side seal grooves 6 formed on both side surfaces 5 and 25 of the rotor 4 which are respectively arranged in face-to-face relation with the side housing 2 and the intermediate housing 12; side seals 7 accommodated respectively in the side seal grooves 6; springs 8 for urging the side seals 7 toward the side housing 2 and the intermediate housing 12, respectively; and at least one flexible linear roller 10 disposed between a side wall surface 9 in the side seal groove 6 and the side seal 7 and accommodated along the side seal 7, three flexible linear rollers 10 being provided in parallel in this embodiment. The side housing 2 and the intermediate housing 12 are disposed in such a manner as to sandwich the rotor housing 3 from both sides thereof.

It should be noted that the side seal grooves 6, the side seals 7, and the like are formed in substantially the same manner on both the side housing 2 side and the intermediate housing 12 side. In the description that follows, a detailed description will be given of the side housing 2 side, and the intermediate housing 12 side will be illustrated in the drawings.

A groove 21 is formed on a rotor axis O-side side surface of each side seal 7 in this embodiment, and the three linear rollers 10 are accommodated in the groove 21 of each side seal 7. The rotor 4 is mounted on an eccentric shaft 23 via a rotor bearing 22, and an apex seal 24 which slidably abuts against the inner surface of the rotor housing 3 is disposed at each apex of the rotor 4. The side seal grooves 6 extend to the vicinity of each apex seal 24, and three apex seals are provided on the side surface 5 of the rotor 4, and the side seal 7 is accommodated in each of the sides seal grooves 6 (the same arrangement is adopted for the other side 25 of the rotor 4 opposite to the side surface 5).

The linear roller 10 accommodated in the groove 21 in each side seal 7 has a circular cross-sectional configuration, and three linear rollers 10 are provided in this embodiment as described above. The present invention is not restricted to the same, and one, two, or four or more linear rollers 10 may be used. The linear roller 10 in this embodiment is formed of a steel wire made of steel, stainless steel, bearing steel, or the like, but it may be formed of other material. In one example, the diameter of the linear roller 10 is selected from the range of 0.2 mm to 1.0 mm, preferably 0.2 mm to 0.5 mm.

In addition, in the rotary engine 1 of this embodiment, an internal gear 31 is attached to the rotor 4, the internal gear 31 meshes with a fixed external gear 32, a main bearing 33 is fitted over the eccentric shaft 23, and oil seal devices 36 and 37 are respectively fitted in two annular grooves 34 and 35 provided on the side surfaces 5 and 25 of the rotor 4.

In the rotary engine 1 thus formed, an end face 41 of the side seal 7 projecting from the side seal groove 6 slidably abuts against the side housing 2 by being urged by the spring 8 accommodated in the side seal groove 6, thereby attaining primary gastightness with respect to an engine operating chamber. In addition, the linear rollers 10 in the recess 21 formed on the axis O-side side surface of the side seal 7 are urged against the side wall surface 9 of the side seal groove 6 facing that side surface by means of the gas pressure and the like of the engine operating chamber, thereby attaining secondary gastightness with respect to an engine operating chamber.

In the rotary engine 1 in this embodiment, since the linear rollers 10 abut against the side wall surface 9, even if the side seal 7 undergoes a very small displacement in the direction of A inside the side seal groove 6 for some reason or other, the side seal 7 is readily restored to its original state through the rotation of the linear rollers 10 or through the rolling friction or low sliding friction due to the linear contact of the linear rollers 10 against the side wall surface 9, thereby always maintaining the primary gastightness reliably. In other words, the spring 8 is capable of causing the end face 41 of the side seal 7 to abut against the side housing 2 slidably and with desired gastightness. Accordingly, in the rotary engine 1, it is possible to reliably prevent the leakage of gases from the engine operating chamber, with the result that the engine efficiency can be enhanced.

Figure 5:
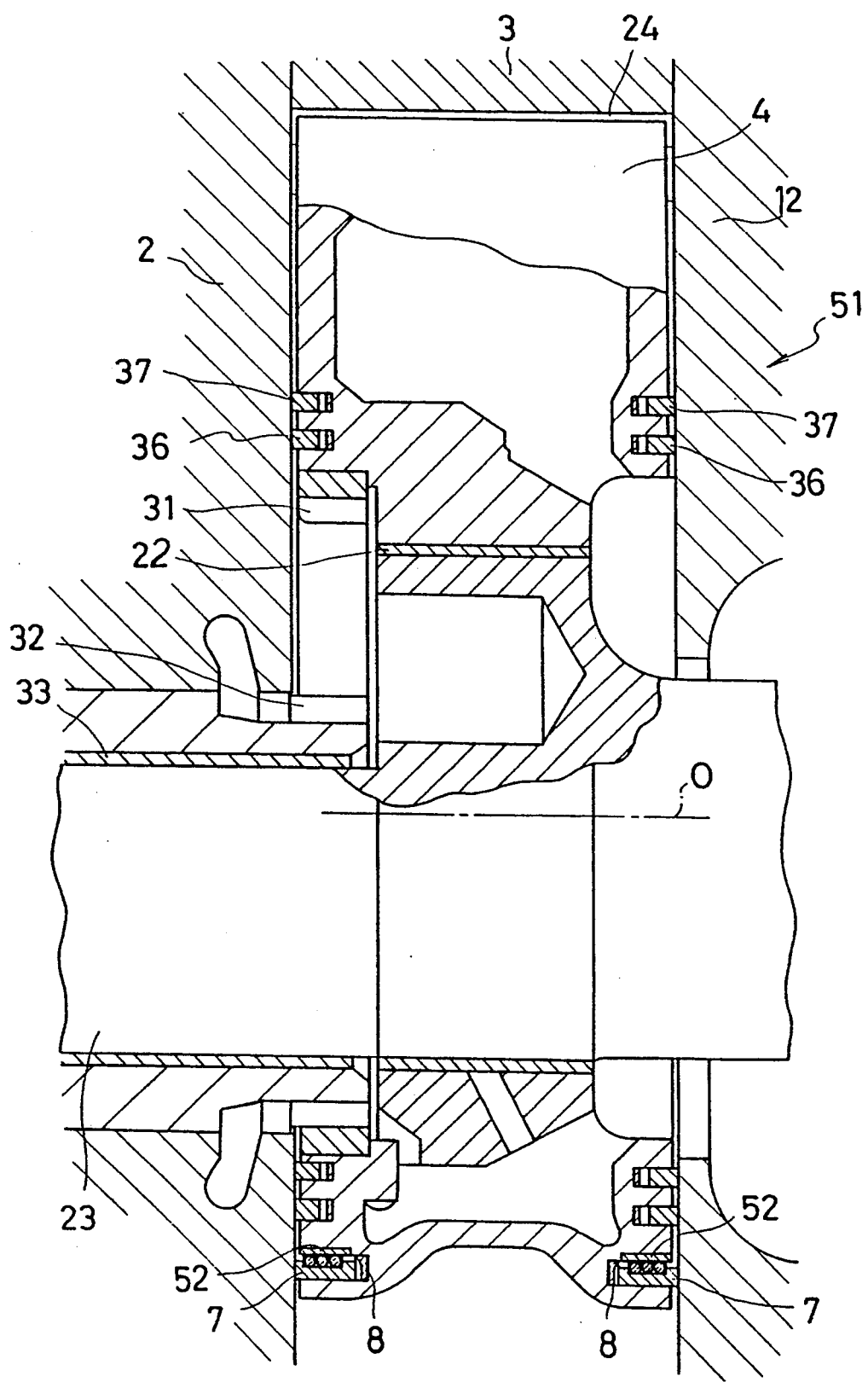
FIG. 5 is a cross-sectional view of another preferred embodiment of the present invention.
Figure 6:
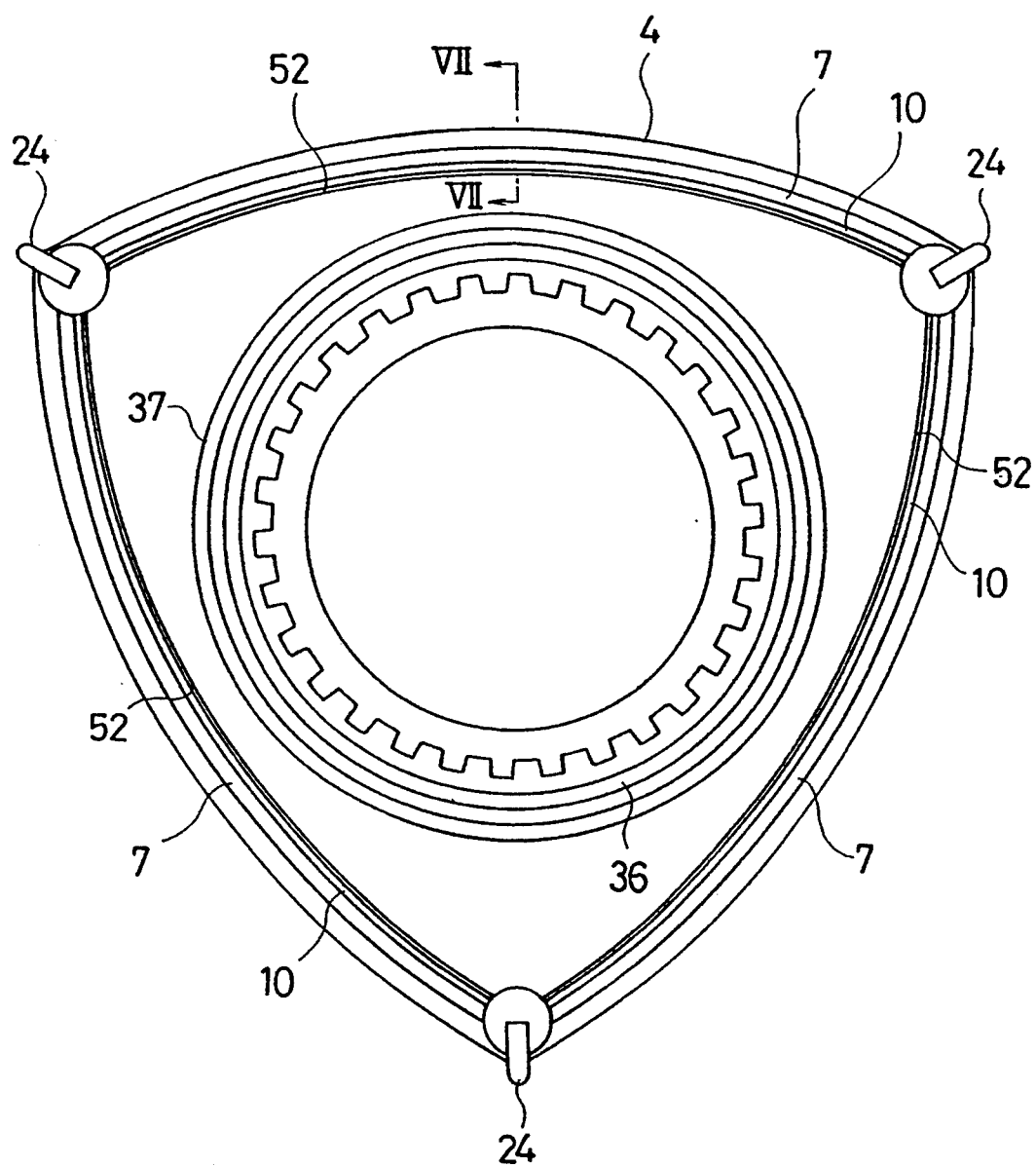
FIG. 6 is a side elevational view of the rotor and the like shown in FIG. 5.
Figure 7:
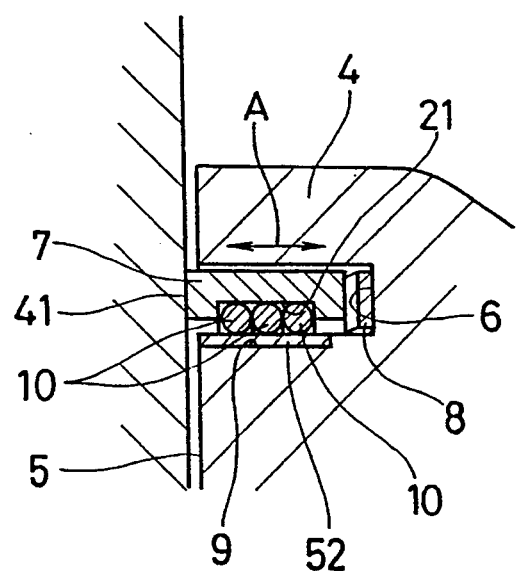
FIG. 7 is a cross-sectional view taken along line II-V—IIV shown in FIG. 6.

In addition, in the present invention, a rotary engine 51 may be formed, as shown in FIGS. 5 to 7. That is, in the rotary engine 51, a thin steel sheet 52 against which the linear rollers 10 abut are secured on the side wall surface 9 of the side seal groove 6 facing the axis O-side position of the side seal 7. If the linear rollers 10 are made to abut against the thin steel sheet 52 in this manner, the linear rollers 10 are prevented from coming into direct contact with the side wall surface 9 of the side seal groove 6, so that it is possible to prevent damage, such as indents, from being caused to the side wall surface 9 by the linear rollers 10. As a result, the return of the side seal 7 to its original position in the direction of A can be effected more favorably. As the thickness of the thin steel sheet, for example, it is possible to 0.05 mm to 0.3 mm, preferably 0.05 mm to 0.1 mm. Also, the thin steel plate 52 is formed of a material such as the stainless steel similar to that of the linear roller 10.

Figure 8:
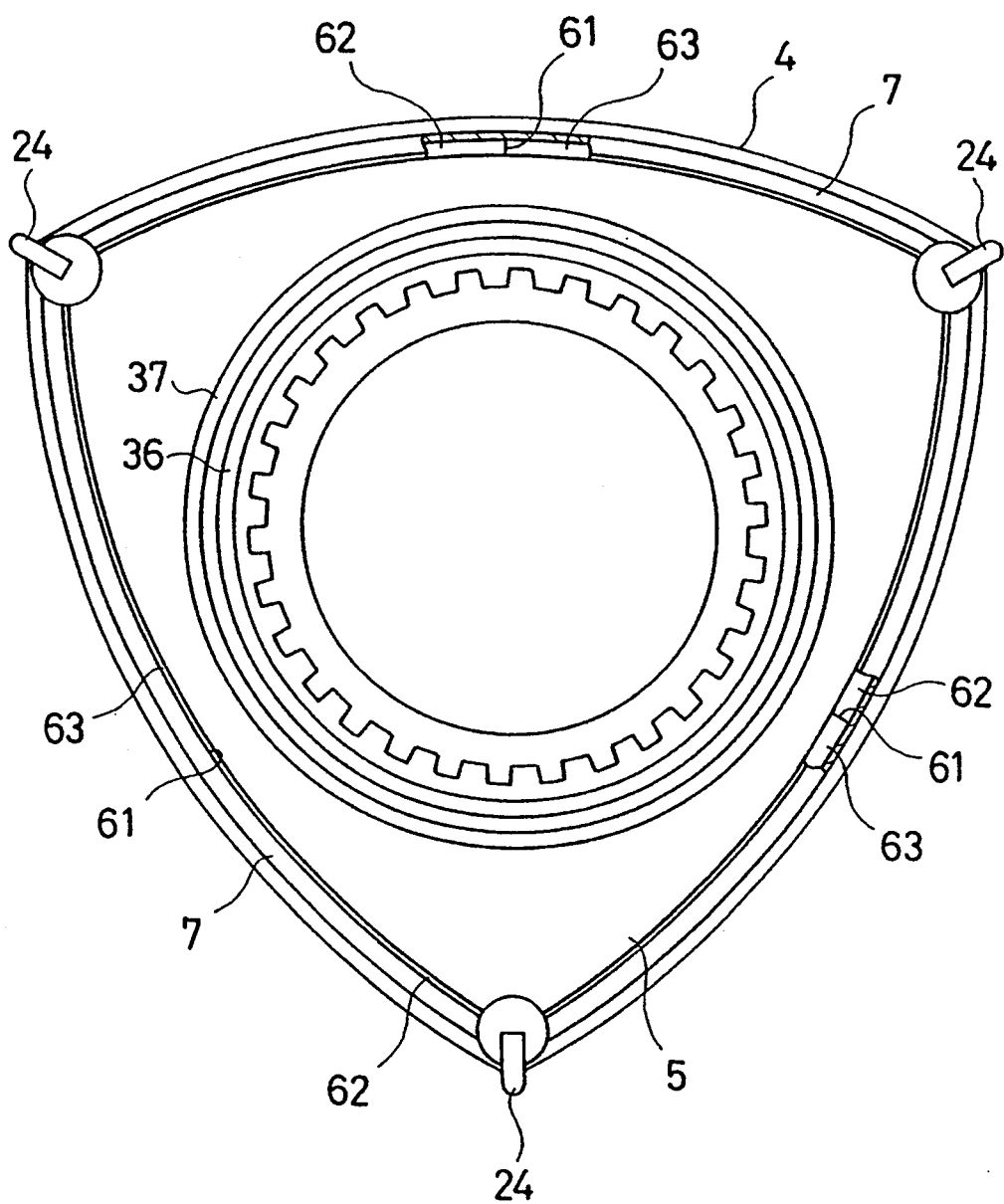
FIG. 8 is a side elevational view of the rotor in accordance with another preferred example of the present invention.

Although in the above-description the rotary engine is constructed by using the three linear rollers 10 fitted in parallel, the linear rollers 10 may be divided and disposed in parallel. That is, as shown in FIG. 8, a plurality of rows, e.g. three rows as in the above-described example, of a plurality of, i.e., in this example two, linear rollers 62 and 63 fitted in series with respective ends facing each other at a position 61 are arranged in the groove 21 of the side seal 7, thereby forming the rotary engine. If the plurality of linear rollers are arranged in series in the groove 21 of each side seal 7, the rotation of the respective linear rollers is facilitated, whereby the return of the side seal 7 to its original position in the direction of A can also be effected more favorably.

Figure 9:
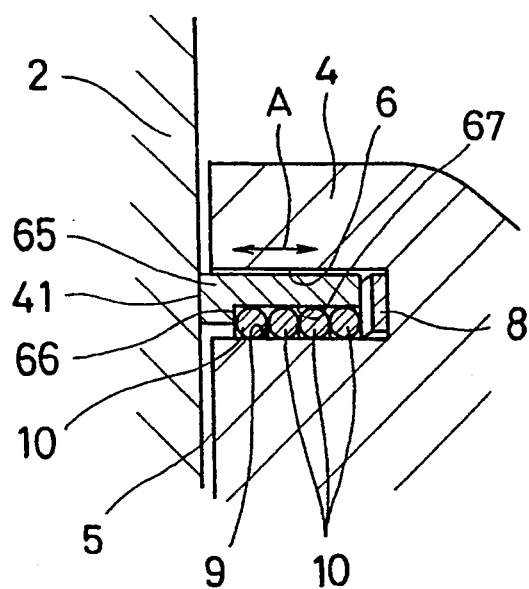
FIG. 9 is a partial cross-sectional view of still another preferred embodiment of the present invention.

In addition, as shown in FIG. 9, an arrangement may be provided such that, by using a side seal 65 having a stepped portion 66 formed thereof, the linear rollers 10 are arranged in a recess 67 of the stepped portion 66, thereby forming the rotary engine. In this example, four linear rollers 10 are accommodated between the stepped portion 66 and the spring 8, and the four linear rollers 10 are maintained in the direction of A by means of the stepped portion 66 and the spring 8.

Figure 10:
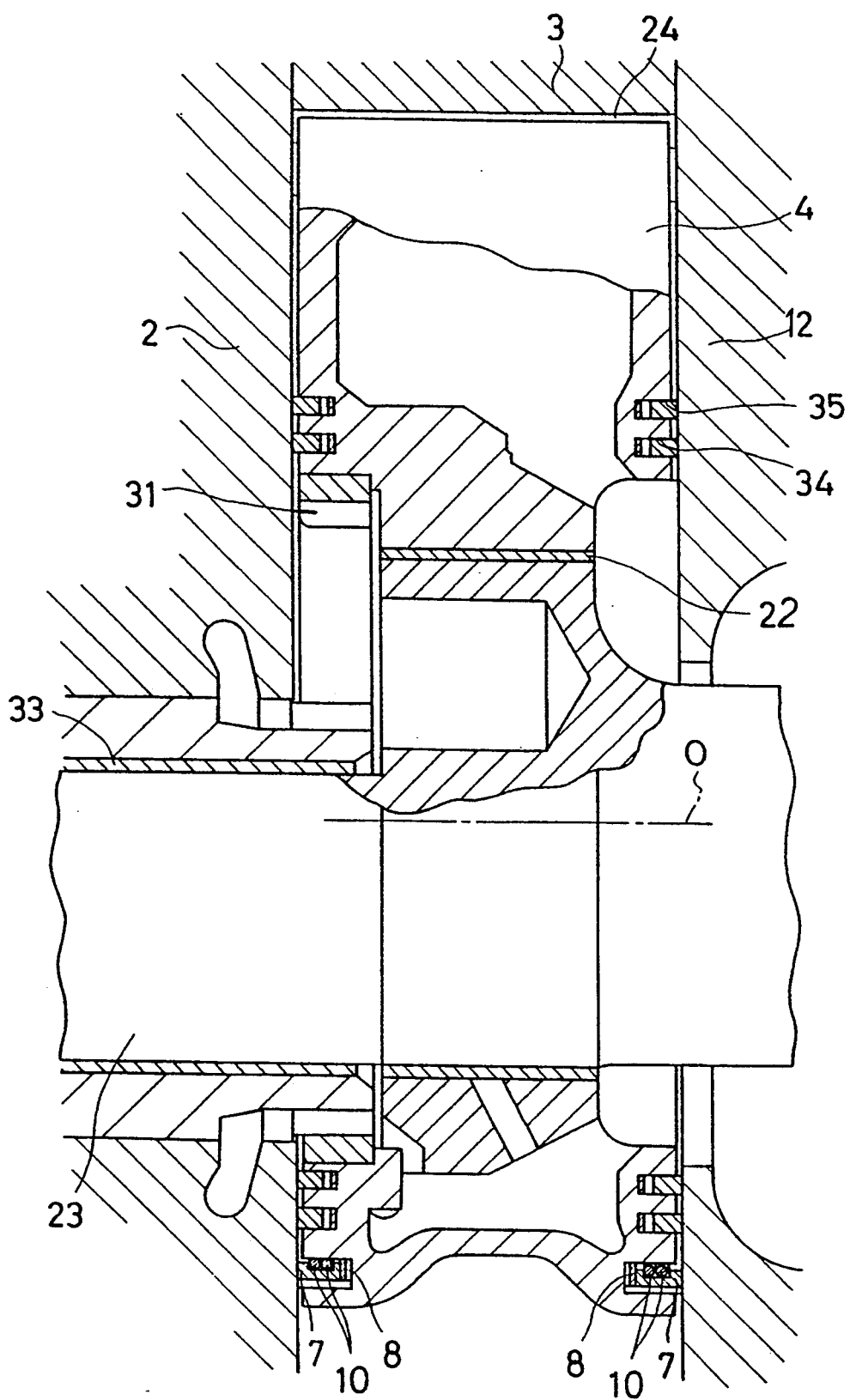
FIG. 10 is a cross-sectional view of a further preferred embodiment of the present invention.
Figure 11:
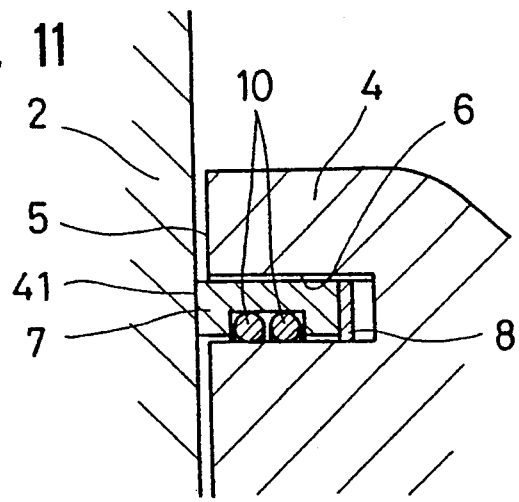
FIG. 11 is a detailed explanatory cross-sectional view of linear rollers, a side seal, and the like shown in FIG. 10.

Although in the foregoing examples, three or four linear rollers 10 are provided, as shown in FIGS. 10 and 11, two linear rollers 10 may be arranged in the groove 21 of the side seal 7, thereby forming the rotary engine.

Figure 12:
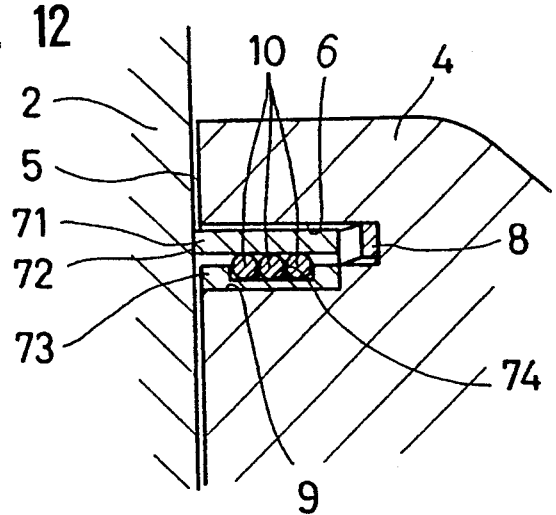
FIG. 12 is a cross-sectional view of a still further preferred embodiment of the present invention.

Furthermore, although in the rotary engine 51 shown in FIGS. 5 to 7, the linear rollers 10 are arranged in the groove 21 of the side seal 7 to hold the linear rollers 10 in the direction of A, as shown in FIG. 12, an arrangement may be provided as follows: A plate-like side seal 71 not having a groove is disposed in the side seal groove 6, a groove 74 for accommodating the linear rollers 10 is formed in a thin steel sheet 73 secured to the side wall surface 9 of the side seal groove 6, the linear rollers 10 are held in the groove 74 of the thin steel sheet 73 in such a manner that the linear rollers 10 do not move in the direction of A but the linear rollers 10 themselves are rotatable, an end face 72 of the side seal 71 is made to abut against the side housing 2 by means of the spring 8, thereby forming the rotary engine of the present invention.

Figure 13:
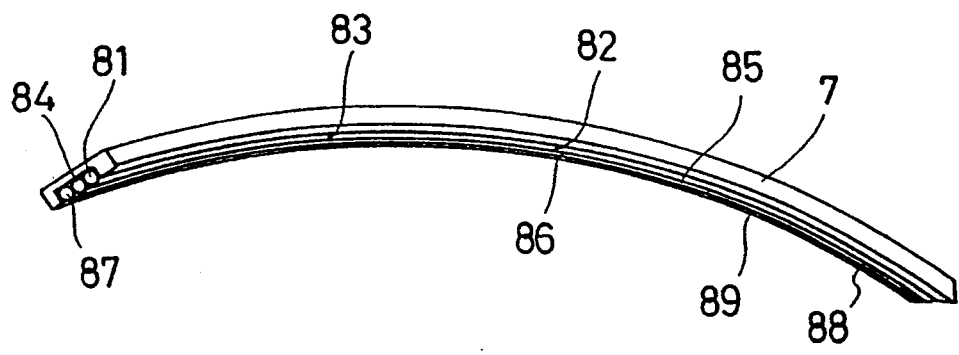
FIG. 13 is a detailed perspective view of linear rollers and a side seal in accordance with a further preferred embodiment of the present invention.

In addition, although, in the example shown in FIG. 8, a series of the linear rollers 62 and 63 juxtaposed in three rows are formed with the same length such that the three positions 61 at which their ends face each other are made be identical, i.e., overlap, as shown in FIG. 13, an arrangement may be provided as follows: Linear rollers 81, 82, 84, 85, 87, and 88 of mutually different lengths are prepared, the linear rollers 81 and 82, the linear rollers 84 and 85, and the linear rollers 87 and 88 are arranged in series, respectively, and these three rows are juxtaposed in the groove of the side seal 7, such that a position 83 of opposing ends of the linear rollers 81 and 82 and a position 86 of opposing ends of the linear rollers 84 and 85, as well as the position 86 of the opposing ends in the row of the linear rollers 84 and 85 and a position 89 of opposing ends in the row of the linear rollers 87 and 88, are made to be mutually different. If the positions of opposing ends in the two adjacent rows of linear rollers are made to be mutually different, it is possible to further reduce the leakage of gasses from the engine operating chamber which pass through gaps between the opposing ends. It should be noted that the positions of the ends are not restricted to those of this example, and it suffices if the positions are set to optimum positions in the light of reducing the gas leakage to a minimum.

We claim:

1. A rotary engine comprising:
    a rotor housing;
    a side housing and an intermediate housing arranged on opposite sides of said rotor housing, respectively:
    a rotor rotatably disposed in said rotor housing and having two side surfaces, one said side surface facing said side housing, another of said side surfaces thereof facing said intermediate housing, said rotor having an axis;
    a side seal groove formed on each of said side surfaces of said rotor;
    side seals disposed in respective side seal grooves;
    springs for pressing said side seals against said side housing and said intermediate housing, respectively;
    linear roller means disposed along said side seals between said side seals and side wall surface of said side seal grooves; and
    a thin metal sheet disposed along a side wall surface of each said side seal groove facing a rotor axis-side side surface of said side seal, said linear roller means abutting said thin metal sheets, respectively.

2. A rotary engine according to claim 1 wherein a groove is formed on a rotor axis-side of each said side wall surface of said side seal, said linear roller means being disposed in said grooves of said side seals.

3. A rotary engine according to claim 1 wherein a stepped portion is formed on a rotor axis-side of each said side wall surface of said side seals, and said linear roller means being disposed in a recess of each said stepped portion.

4. A rotary engine according to claim 1, wherein a groove is formed in said thin metal sheet for accommodating said linear roller means.

5. A rotary engine according to claim 1 wherein said linear roller means includes a plurality of linear rollers arranged parallel to one another.

6. A rotary engine according to claim 1 wherein said linear roller means includes a plurality of linear rollers arranged end-to-end.

7. A rotary engine according to claim 1 wherein said linear roller means includes at least first and second rows of flexible linear elongated rollers, the first row of the linear rollers being arranged parallel to the second row of the linear rollers, the linear rollers of the first row having end faces arranged in end-to-end relation relative to one another, the linear rollers of the second row having end faces in end-to-end relation relative to one another, said end faces of the linear rollers in the first row being spaced from said end faces of the linear rollers in the second row.

8. A rotary engine according to claim 1 wherein said seal grooves are arcuate and elongated, said linear elongated roller means disposed in said arcuate elongated grooves and extending arcuately in said grooves.

9. A rotary engine comprising:
   a side housing;
   a rotor housing;
   a rotor disposed in said rotor housing and rotatable about an axis;
   a side seal groove formed on a side surface of said rotor facing said side housing;
   a side seal disposed in said side seal groove;
   a spring for urging said side seal against said side housing;
   linear roller means disposed along said side seal between said side seal and a side wall surface of said side seal groove; and
   a thin metal sheet disposed along said side wall surface of said side seal groove facing a rotor axis-side side surface of said side seal, said linear roller means abutting said thin metal sheet.

10. A rotary engine according to claim 9 wherein said rotor has an axis, a groove formed on a rotor axis-side of a side wall surface of said side seal, said linear roller means being disposed in said groove.

11. A rotary engine according to claim 9, including a stepped portion formed on said rotor axis-side surface of said side seal, and said linear roller means being disposed in a recess of said stepped portion.

12. A rotary engine according to claim 9 wherein a groove is formed in said thin metal sheet for accommodating said linear roller means.

13. A rotary engine according to claim 9 wherein said linear roller means includes a plurality of linear rollers arranged parallel to one another.

14. A rotary engine according to claim 9 wherein said linear roller means includes a plurality of flexible linear elongated rollers arranged end-to-end.

15. A rotary engine according to claim 9 wherein said linear roller means includes at least first and second rows of flexible linear elongated rollers, the first row of the linear rollers being arranged parallel to the second row of the linear rollers, the linear rollers of the first row having end faces in end-to-end relation relative to one another, the linear rollers of the second row being arranged in end-to-end relation relative to one another, said end faces of the linear rollers in the first row being spaced from said end faces of the linear rollers in the second row.

16. A rotary engine according to claim 9 wherein said seal grooves are arcuate and elongated, said linear elongated roller means disposed in said arcuate elongated grooves and extending arcuately in said grooves.

17. A rotary engine comprising:
   a rotor housing;
   a side housing and an intermediate housing arranged on opposite sides of said rotor housing, respectively;
   a rotor rotatably disposed in said rotor housing and having an axis and two side surfaces, one said side surface facing said side housing, another of said side surfaces thereof facing said intermediate housing;
   a side seal groove formed on each of said side surfaces of said rotor;
   side seals disposed in respective side seal grooves;
   springs for pressing said side seals against said side housing and said intermediate housing, respectively; and
   flexible linear elongated roller means disposed along each said side seal between said side seal and a side wall surface of said seal groove;
   a thin metal sheet disposed along said side wall surface of said side seal groove facing a rotor axis-side side surface of said side seal, said linear roller means abutting said thin metal sheet.

18. A rotary engine according to claim 17 wherein said side seal is formed with a groove on a rotor axis-side of a side wall surface thereof, said linear roller means being disposed in said groove.

19. A rotary engine according to claim 17 wherein said side seal is formed with a stepped portion on a rotor axis-side of a side wall surface thereof, and said linear roller means being disposed in a recess of said stepped portion.

20. A rotary engine according to claim 17, including a groove formed in said thin metal sheet for accommodating said linear roller means.

21. A rotary engine according to claim 17 wherein said linear roller means includes a plurality of flexible linear elongated rollers arranged parallel to one another.

22. A rotary engine according to claim 21, including a groove formed in said thin metal sheet for accommodating said linear roller means.

23. A rotary engine according to claim 17 wherein said linear roller means includes a plurality of flexible linear elongated rollers arranged end-to-end.

24. A rotary engine according to claim 23, including a groove formed in said thin metal sheet for accommodating said linear roller means.

25. A rotary engine according to claim 17 wherein said linear roller means includes at least first and second rows of flexible linear elongated rollers, the first row of the linear rollers being arranged parallel to the second row of the linear rollers, the linear rollers of the first row having end faces in end-to-end relation relative to one another, the linear rollers of the second row having end faces in end-to-end relation relative to one another, said end faces of the linear rollers in the first row being spaced from said end faces of the linear rollers in the second row.

26. A rotary engine according to claim 25, including a groove formed in said thin metal sheet for accommodating said linear roller means.

27. A rotary engine according to claim 17 wherein said seal grooves are arcuate and elongated, said flexible linear elongated roller means being disposed in said arcuate elongated grooves and extending arcuately in said grooves.

28. A rotary engine comprising:
   a rotor housing;
   a side housing and an intermediate housing arranged on opposite sides of said rotor housing, respectively;
   a rotor rotatably disposed in said rotor housing and having two side surfaces, one said side surface facing said side housing, another of said side surfaces thereof facing said intermediate housing;
   a side seal groove formed on each of said side surfaces of said rotor;
   side seals disposed in respective side seal grooves;
   springs for pressing said side seals against said side housing and said intermediate housing, respectively; and
   flexible linear elongated roller means disposed along each said side seal between said side seal and a side wall surface of said seal groove, said linear roller means including a plurality of flexible linear elongated rollers arranged end-to-end.

29. A rotary engine according to claim 28 wherein said rotor has an axis, and said side seal is formed with a groove on a rotor axis-side of a side wall surface thereof, said linear roller means being disposed in said groove.

30. A rotary engine according to claim 28 wherein said rotor has an axis, and said side seal is formed with a stepped portion on a rotor axis-side of a side wall surface thereof, and said linear roller means being disposed in a recess of said stepped portion.

31. A rotary engine according to claim 28 wherein said rotor has an axis, and a thin metal sheet disposed along said side wall surface of said side seal groove facing a rotor axis-side side surface of said side seal, said linear roller means abutting said thin metal sheet.

32. A rotary engine according to claim 31, including a groove formed in said thin metal sheet for accommodating said linear roller means.

33. A rotary engine according to claim 28 wherein said linear roller means includes a plurality of flexible linear elongated rollers arranged parallel to one another.

34. A rotary engine according to claim 33 wherein said rotor has an axis, and a thin metal sheet disposed along said side wall surface of said side seal groove facing a rotor axis-side side surface of said side seal, said linear roller means abutting said thin metal sheet.

35. A rotary engine according to claim 34, including a groove formed in said thin metal sheet for accommodating said linear roller means.

36. A rotary engine according to claim 28 wherein said linear roller means includes at least first and second rows of flexible linear elongated rollers, the first row of the linear rollers being arranged parallel to the second row of the linear rollers, the linear rollers of the first row having end faces in end-to-end relation relative to one another, the linear rollers of the second row having end faces in end-to-end relation relative to one another, said end faces of the linear rollers in the first row being spaced from said end faces of the linear rollers in the second row.

37. A rotary engine according to claim 36 wherein said rotor has an axis, and a thin metal sheet disposed along said side wall surface of said side seal groove facing a rotor axis-side side surface of said side seal, said linear roller means abutting said thin metal sheet.

38. A rotary engine according to claim 37, including a groove formed in said thin metal sheet for accommodating said liner roller means.

39. A rotary engine according to claim 28 wherein said seal grooves are arcuate and elongated, said flexible linear elongated roller means being disposed in said arcuate elongated grooves and extending arcuately in said grooves.

40. A rotary engine comprising:
a rotor housing;
a side housing and an intermediate housing arranged on opposite sides of said rotor housing, respectively;
a rotor rotatably disposed in said rotor housing and having two side surfaces, one said side surface facing said side housing, another of said side surfaces thereof facing said intermediate housing;
a side seal groove formed on each of said side surfaces of said rotor;
side seals disposed in respective side seal grooves;
springs for pressing said side seals against said side housing and said intermediate housings, respectively: and
flexible linear elongated roller means disposed along each said side seal between said side seal and a side wall surface of said seal groove, said linear roller means including at least first and second rows of flexible linear elongated rollers, the first row of the linear rollers being arranged parallel to the second row of the linear rollers, the linear rollers of the first row having end faces in end-to-end relation relative to one another, the linear rollers of the second row having end faces in end-to-end relation relative to one another, said end faces of the linear rollers in the first row being spaced from said end faces of the linear rollers in the second row.

41. A rotary engine according to claim 40 wherein said rotor has an axis, said side seal being formed with a groove on a rotor axis-side of a side wall surface thereof, side linear roller means being disposed in said groove.

42. A rotary engine according to claim 40 wherein said rotor has an axis, said side seal is formed with a stepped portion on a rotor axis-side of a side wall surface thereof, and said linear roller means being disposed in a recess of said stepped portion.

43. A rotary engine according to claim 40 wherein said rotor has an axis, and a thin metal sheet disposed along said side wall surface of said side seal groove facing a rotor axis-side side surface of said side seal, said linear roller means abutting said thin metal sheet.

44. A rotary engine according to claim 43, including a groove formed in said thin metal sheet for accommodating said linear roller means.

45. A rotary engine according to claim 40 wherein said seal grooves are arcuate and elongated, said flexible linear elongated roller means being disposed in said arcuate elongated grooves and extending arcuately in said grooves.

46. A rotary engine comprising:
a rotor housing having a side surface;
a rotor rotatably disposed in said rotor housing and having an axis;
a side seal groove formed on a side surface of said rotor facing said side surface of said housing;
a side seal disposed in said side seal groove;
a spring for urging said side seal against said side surface of said housing;
flexible linear elongated roller means disposed along said side seal between said side seal and a side wall surface of said side seal groove; and
a thin metal sheet disposed along said side wall surface of said side seal groove facing a rotor axis-side side surface of said side seal, said linear roller means abutting said thin metal sheet.

47. A rotary engine according to claim 46 wherein said side seal is formed with a groove on a rotor axis-side of a side wall surface thereof, and said linear roller means being disposed in said groove of said side seal.

48. A rotary engine according to claim 46 wherein said side seal is formed with a stepped portion on a rotor axis-side of a side wall surface thereof, and said linear roller means being disposed in a recess of said stepped portion.

49. A rotary engine according to claim 46, including a groove formed in said thin metal sheet for accommodating said linear roller means.

50. A rotary engine according to claim 46 wherein said linear roller means includes a plurality of flexible linear elongated rollers arranged parallel to one another.

51. A rotary engine according to claim 46 wherein said linear roller means includes a plurality of flexible linear elongated rollers arranged end-to-end.

52. A rotary engine according to claim 46 wherein said linear roller means includes at least first and second rows of flexible linear elongated rollers, the first row of the linear rollers being arranged parallel to the second row of the linear rollers, the linear rollers of the first row having end faces in end-to-end relation relative to one another, the linear rollers of the second row having end faces in end-to-end relation relative to one another, said end faces of the linear rollers in the first row being spaced from said end faces of the linear rollers in the second row.

53. A rotary engine according to claim 46 wherein said seal grooves are arcuate and elongated, said flexible linear elongated roller means being disposed in said arcuate elongated grooves and extending arcuately in said grooves.

54. A rotary engine comprising:
a rotor housing having a side surface;
a rotor rotatably disposed in said rotor housing;
a side seal groove formed on a side surface of said rotor facing said side surface of said housing;
a side seal disposed in said side seal groove;
a spring for urging said side seal against said side surface of said housing; and
flexible linear elongated roller means disposed along said side seal between said side seal and a side wall surface of said side seal groove, said linear roller means including a plurality of flexible linear elongated rollers arranged end-to-end.

55. A rotary engine according to claim 54 wherein said rotor has an axis, said side seal being formed with a groove on a rotor axis-side of a side wall surface thereof, and said linear roller means being disposed in a said groove of said side seal.

56. A rotary engine according to claim 54 wherein said rotor has an axis, said side seal is formed with a stepped portion on a rotor axis-side of a side wall surface thereof, and said linear roller means being disposed in a recess of said stepped portion.

57. A rotary engine according to claim 54 wherein said rotor has an axis, and a thin metal sheet disposed along said side wall surface of said side seal groove facing a rotor axis-side side surface of said side seal, said linear roller means abutting said thin metal sheet.

58. A rotary engine according to claim 57, including a groove formed in said thin metal sheet for accommodating said linear roller means.

59. A rotary engine according to claim 54 wherein said linear roller means includes a plurality of flexible linear elongated rollers arranged parallel to one another.

60. A rotary engine according to claim 59 wherein said rotor has an axis, and a thin metal sheet disposed along said side wall surface of said side seal groove facing a rotor axis-side side surface of said side seal, said linear roller means abutting said thin metal sheet.

61. A rotary engine according to claim 60, including a groove formed in said thin metal sheet for accommodating said linear roller means.

62. A rotary engine according to claim 54 wherein said linear roller means includes at least first and second rows of flexible linear elongated rollers, the first row of the linear rollers being arranged parallel to the second row of the linear rollers, the linear rollers of the first row having end faces in end-to-end relation relative to one another, the linear rollers of the second row having end faces in end-to-end relation relative to one another, said end faces of the linear rollers in the first row being spaced from said end faces of the linear rollers in the second row.

63. A rotary engine according to claim 54 wherein said seal grooves are arcuate and elongated, said flexible linear elongated roller means being disposed in said arcuate elongated grooves and extending arcuately in said grooves.

64. A rotary engine comprising:
a rotor housing having a side surface;
a rotor rotatably disposed in said rotor housing;
a side seal groove formed on a side surface of said rotor facing said side surface of said housing;
a side seal disposed in said side seal groove;
a spring for urging said side seal against said side surface of said housing; and
flexible linear elongated roller means disposed along said side seal between said side seal and a side wall surface of said side seal groove, said linear roller means including at least first and second rows of flexible linear elongated rollers, the first row of the linear rollers being arranged parallel to the second row of the linear rollers, the linear rollers of the first row having end faces in end-to-end relation relative to one another, the linear rollers of the second row having end faces in end-to-end relation relative to one another, said end faces of the linear rollers in the first row being spaced from said end faces of the linear rollers in the second row.

65. A rotary engine according to claim 64 wherein said rotor has an axis, and a groove formed on a rotor axis-side of a side wall surface of said side seal, and said linear roller means being disposed in a said groove of said side seal.

66. A rotary engine according to claim 64 wherein said rotor has an axis, and a stepped portion formed on a rotor axis-side of a side wall surface of said side seal, and said linear roller means being disposed in a recess of said stepped portion.

67. A rotary engine according to claim 64 wherein said seal grooves are arcuate and elongated, said flexible linear elongated roller means being disposed in said arcuate elongated grooves and extending arcuately in said grooves.

* * * * *